(12) United States Patent
Takahashi

(10) Patent No.: US 7,274,634 B2
(45) Date of Patent: Sep. 25, 2007

(54) INFORMATION RECORDING MEDIUM CAPABLE OF DEFECT MANAGEMENT, INFORMATION RECORDING APPARATUS CAPABLE OF DEFECT MANAGEMENT, AND INFORMATION PLAYBACK APPARATUS FOR PLAYING BACK INFORMATION FROM DEFECT-MANAGED MEDIUM

(75) Inventor: Hideki Takahashi, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/281,373

(22) Filed: Nov. 18, 2005

(65) Prior Publication Data

US 2006/0077827 A1    Apr. 13, 2006

Related U.S. Application Data

(62) Division of application No. 10/101,979, filed on Mar. 21, 2002, now Pat. No. 7,002,882.

(30) Foreign Application Priority Data

Mar. 22, 2001    (JP) ............................ 2001-083670

(51) Int. Cl.
*G11B 7/007* (2006.01)
(52) U.S. Cl. .................. 369/47.14; 369/53.17
(58) Field of Classification Search ............. None
See application file for complete search history.

(56) References Cited

U.S. PATENT DOCUMENTS

| | | | |
|---|---|---|---|
| 5,319,626 A | 6/1994 | Ozaki et al. | |
| 5,404,357 A * | 4/1995 | Ito et al. | ................ 714/719 |
| 6,341,109 B1 | 1/2002 | Kayanuma | |
| 6,469,978 B1 | 10/2002 | Ohata et al. | |
| 6,606,285 B1 | 8/2003 | Ijtsma et al. | |
| 6,732,303 B1 | 5/2004 | Sasaki et al. | |
| 6,741,534 B1 | 5/2004 | Takahashi et al. | |
| 6,788,642 B2 | 9/2004 | Hirotsune et al. | |
| 6,967,917 B1 * | 11/2005 | Numata et al. | .......... 369/53.17 |
| 7,002,882 B2 * | 2/2006 | Takahashi | ............. 369/47.14 |

FOREIGN PATENT DOCUMENTS

| | | | |
|---|---|---|---|
| CN | 1242574 | | 1/2000 |
| EP | 845780 A1 * | | 6/1998 |
| JP | 9-167446 | | 6/1997 |
| JP | 9-265737 | | 10/1997 |
| JP | 2000-357374 | | 12/2000 |

* cited by examiner

*Primary Examiner*—Andrea Wellington
*Assistant Examiner*—Michael V. Battaglia
(74) *Attorney, Agent, or Firm*—Oblon, Spivak, McClelland, Maier & Neustadt, P.C.

(57) ABSTRACT

An information recording medium according to an aspect of this invention includes a data area (A2) for recording user data and an address area (DMA address area) for recording address data that indicates the position of a defect management area that manages a defect present in the data area.

1 Claim, 16 Drawing Sheets

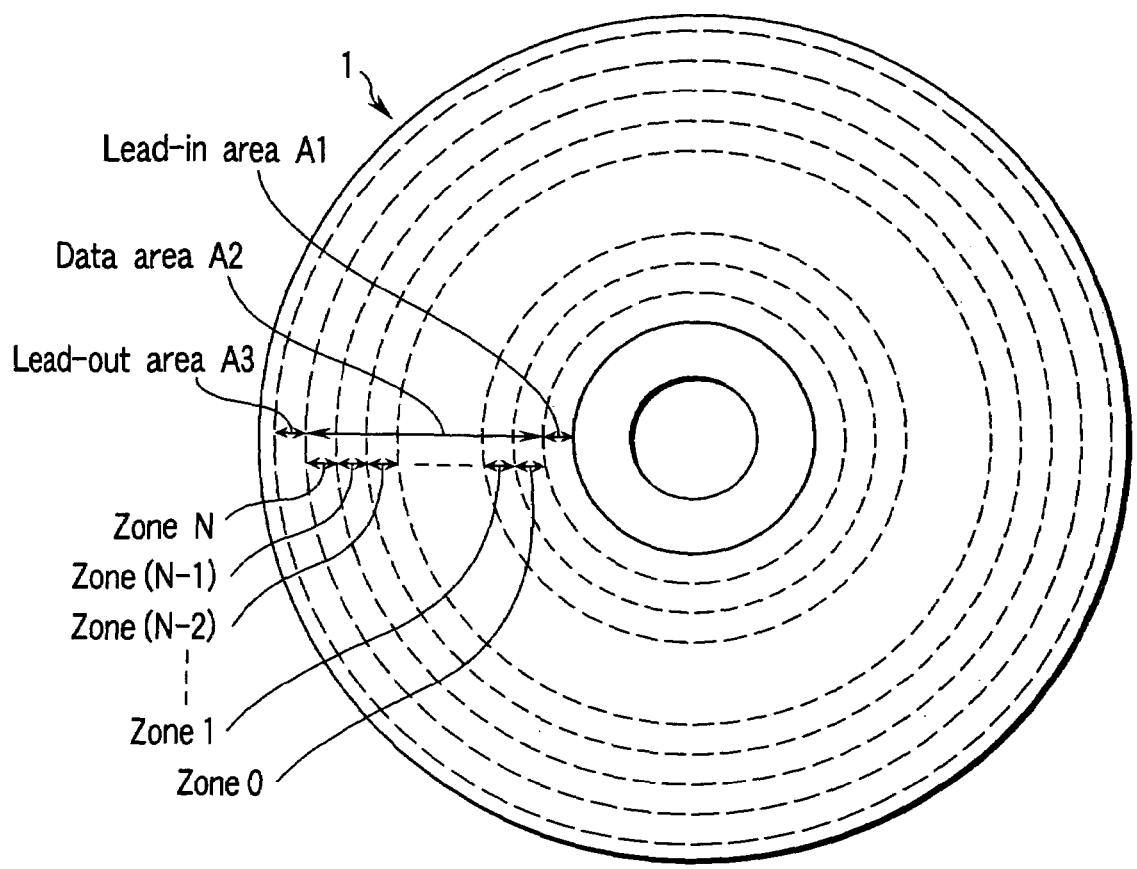
F I G. 1

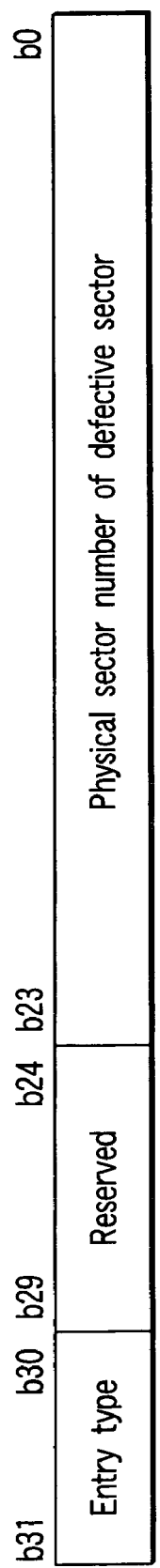
F I G. 7

| FRM | Reserved | Physical sector number of first sector in defective block | Reserved | Physical sector number of first sector in replacement block |
|---|---|---|---|---|
| b63 | b62 ... b56 | b55 ... b32 | b31 ... b24 | b23 ... b0 |

FIG. 8

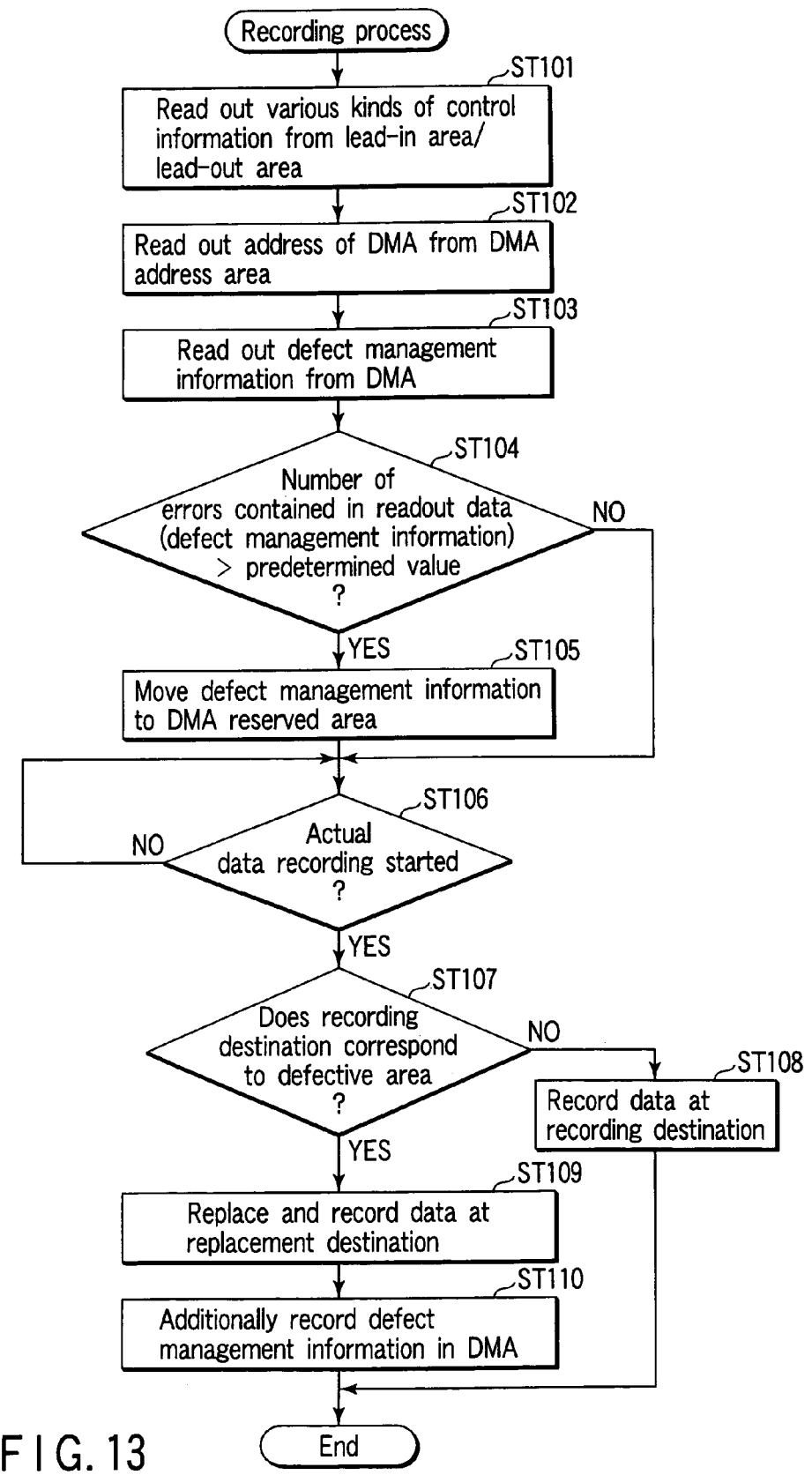
F I G. 13

INFORMATION RECORDING MEDIUM CAPABLE OF DEFECT MANAGEMENT, INFORMATION RECORDING APPARATUS CAPABLE OF DEFECT MANAGEMENT, AND INFORMATION PLAYBACK APPARATUS FOR PLAYING BACK INFORMATION FROM DEFECT-MANAGED MEDIUM

CROSS-REFERENCE TO RELATED APPLICATIONS

This application is based upon and claims the benefit of priority from the prior Japanese Patent Application No. 2001-083670, filed Mar. 22, 2001; and is a divisional of U.S. patent application Ser. No. 10/101,979 filed Mar. 21, 2002, now U.S. Pat. No. 7,002,882, the entire contents of which are incorporated herein by reference.

BACKGROUND OF THE INVENTION

1. Field of the Invention

The present invention relates to an information recording medium such as a DVD (Digital Video Disk) characterized by high-density recording and, more particularly, to a rewritable information recording medium. The present invention also relates to an information recording apparatus for recording information on such an information recording medium. The present invention also relates to an information playback apparatus for playing back information from such an information recording medium.

2. Description of the Related Art

In recent years, DVDs have been extensively studied. DVDs are roughly classified into read-only DVD-ROMs and rewritable DVD-RAMs. A DVD-RAM has a lead-in area, data area, and lead-out area. The data area has a user area where user data is recorded and a spare area which compensates for a defective area in the user area. For defect management, defect management tables in the lead-in and lead-out are used. On the basis of this defect management, a replacement process is executed. For example, Jpn. Pat. Appln. KOKAI Publication No. 11-185390 discloses a technique related to defect management.

The positions of defect management tables are permanently assigned for each format. The reliability of a table itself is increased by preparing a plurality of tables with identical contents. In this method, however, every time a defect occurs, all tables must be rewritten, resulting in access delay.

BRIEF SUMMARY OF THE INVENTION

It is an object of the present invention to provide an information recording medium capable of contributing to solve the above-described problem.

(1) An information recording medium according to an aspect of the present invention comprises, a data area for recording user data, and an address area for recording address data that indicates a position of a defect management area that manages a defect present in the data area.

(2) The information recording medium comprises, a management area for recording management information, and a data area for recording user data, the data area comprising a spare area serving as a replacement destination of a defective area that may exist in the data area, and a defect management area for recording defect management information representing a relationship between the defective area and the spare area, and the management area comprising an address area for recording address data that indicates the position of the defect management area.

An information recording apparatus according to an aspect of the present invention records information on the above information recording medium and comprises a preprocessing section configured to read out address data from the address area and to read out defect management information from the defect management area on the basis of the address data, a recording section configured to record desired data in the data area, a replacement recording section configured to record the desired data in the spare area serving as a replacement destination of the defective area when it is determined on the basis of the defect management information that a recording destination of the desired data corresponds to a defective area, and a post-processing section configured to record the defect management information representing that replacement and recording have been executed by the replacement recording section in the defect management area.

(3) The information recording medium comprises a management area for recording management information, and a data area for recording user data, the data area comprising a spare area serving as a replacement destination of a defective area that may exist in the data area, and a defect management area for recording defect management information representing a relationship between the defective area and the spare area, and the management area comprising an address area for recording address data that indicates the position of the defect management area.

An information playback apparatus according to an aspect of the present invention plays back information from the above information recording medium and comprises a preprocessing section configured to read out address data from the address area and to read out defect management information from the defect management area on the basis of the address data, a playback section configured to play back desired data from the data area, and a replacement playback section configured to play back the desired data from the spare area serving as a replacement destination of the defective area when it is determined on the basis of the defect management information that a recording destination of the desired data corresponds to the defective area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing the layout of a lead-in area, data area, lead-out area, and the like on an optical disk;

FIG. 7 is a view showing the data structure of a PDL (Primary Defect List);

FIG. 8 is a view showing the data structure of an SDL (Secondary Defect List);

FIG. 13 is a flow chart for explaining a recording process for the optical disk;

DETAILED DESCRIPTION OF THE INVENTION

Figure 2:
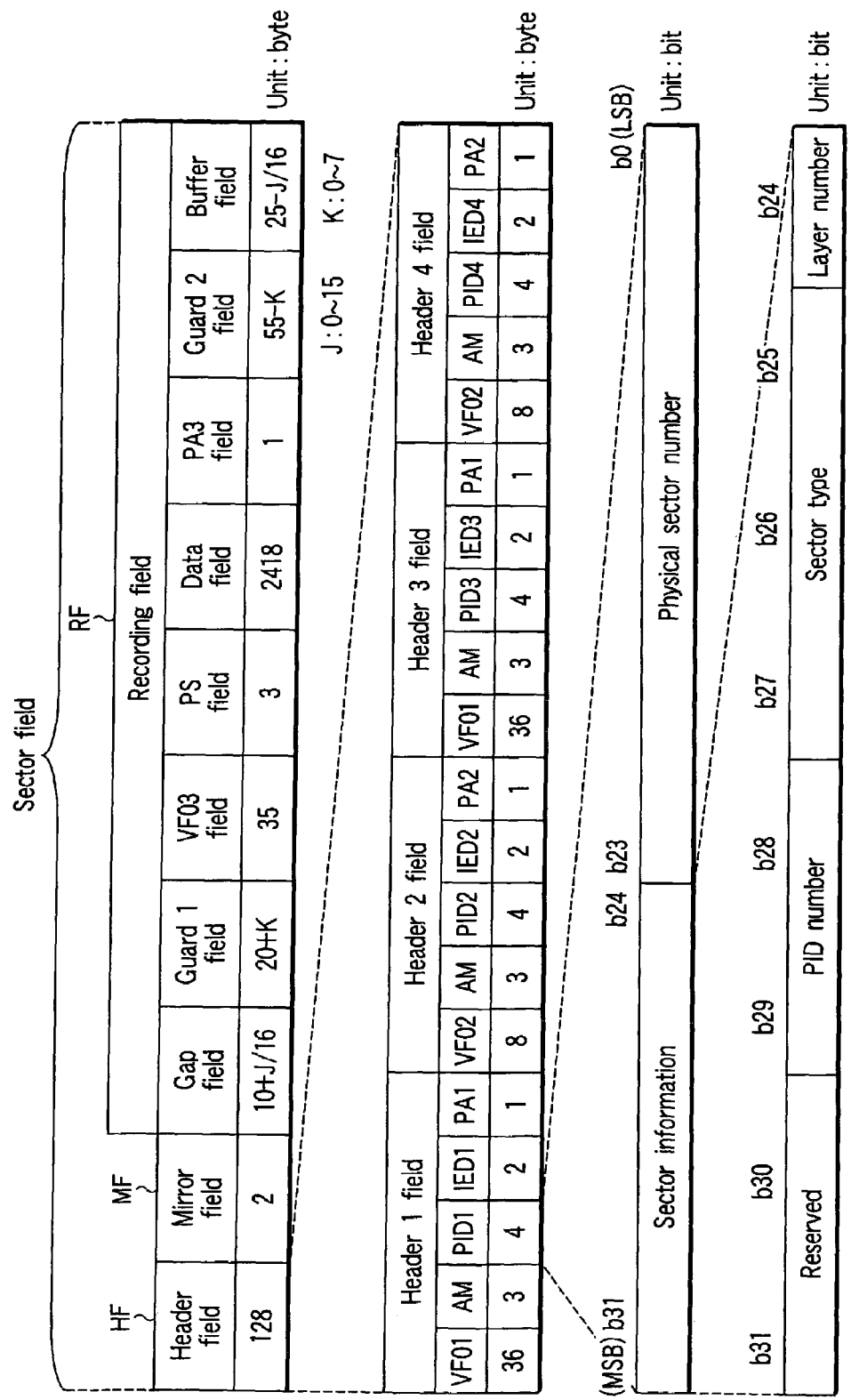
FIG. 2 is a view showing the data structure of a sector field on the optical disk.

An embodiment of the present invention will be described below with reference to the accompanying drawing.

An optical disk (DVD-RAM disk) 1 serving as an information recording medium will be described first with reference to FIG. 1.

FIG. 1 shows the layout of a lead-in area, data area, lead-out area, and the like on an optical disk.

As shown in FIG. 1, a lead-in area A1, data area A2, and lead-out area A3 are assured on an optical disk 1 in turn from the inner periphery side. The lead-in area A1 includes an emboss data zone, mirror zone (non-recording zone), and rewritable data zone. The data area A2 includes a rewritable data zone, which includes a plurality of zones 0 to N. The lead-out area A3 includes a rewritable data zone.

On the emboss data zone in the lead-in area A1, a reference signal and control data are recorded as a embossed pattern upon manufacturing the optical disk 1. On the rewritable data zone in the lead-in area A1, identification data for identifying the type of disk, defect management data for managing defective areas, and the like are recorded. Note that an area where the defect management data is recorded will be referred to as a DMA (Defect Management Area) hereinafter. On the rewritable data zone in the lead-out area A3, the same data as those recorded on the rewritable data zone in the lead-in area A1 are recorded.

The emboss data zone in the lead-in area A1 consists of a plurality of tracks, each of which consists of a plurality of sector fields. This zone is processed at a predetermined rotational speed.

Each of the rewritable data zone in the lead-in area A1 and zone 0 of the rewritable data zone in the data area A2 consists of X tracks, each of which consists of Y sector fields. This zone is processed at a rotational speed Z0 (Hz).

Zone 1 of the rewritable data zone in the data area A2 consists of X tracks, each of which consists of (Y+1) sector fields. This zone is processed at a rotational speed Z1 (Hz).

Zone 2 of the rewritable data zone in the data area A2 consists of X tracks, each of which consists of (Y+2) sector fields. This zone is processed at a rotational speed Z2 (Hz) (Z1>Z2).

Each of zones 3 to N of the rewritable data zone in the data area A2 consists of X tracks. Each track in zone 3 consists of (Y+3) sector fields, and each track in zone 4 consists of (Y+4) sector fields. That is, each track in zone N consists of (Y+N) sector fields. Zone 3 is processed at a rotational speed Z3 (Hz) (Z2>Z3), and zone 4 is processed at a rotational speed Z4 (Hz) (Z3>Z4). That is, zone N is processed at a rotational speed ZN (Hz) (Z(N−1)>ZN).

The rewritable data zone in the lead-out area A3 consists of a plurality of tracks, each of which consists of (Y+N) sector fields. This zone is processed at a rotational speed ZN (Hz).

As described above, the number of sector fields per track increases and the rotational speed lowers in turn from the zones on the inner periphery side of the optical disk 1. That is, the optical disk 1 is compatible with the ZCLV (Zone Constant Linear Velocity) scheme.

Subsequently, the format of a sector field on the DVD-RAM disk will be explained below with reference to FIG. 2.

As shown in FIG. 2, one sector field consists of nearly 2,697 bytes. This sector field records data modulates by 8-16 modulation. 8-16 modulation modulates an 8-bit input code sequence into a 16-bit output code sequence. The input code sequence is called input bits, and the output code sequence channel bits. Note that 1 byte means 16 channel bits.

The contents of one sector field will be explained below. One sector field is constructed by a 128-byte header field HF, 2-byte mirror field MF, and 2,567-byte recording field RF.

The header field HF records header data as an embossed pattern in the manufacturing process of the optical disk. In this header field HF, header data is written four times to improve detection precision of header data. That is, this header field HF contains a header 1 field, header 2 field, header 3 field, and header 4 field. Each of the header 1 field and header 3 field consists of 46 bytes. Each of the header 2 field and header 4 field consists of 18 bytes.

The header 1 field contains 36-byte VFO (Variable Frequency Oscillator) 1, 3-byte AM (Address Mark), 4-byte PID (Physical ID) 1, 2-byte IED (ID Error Detection Code) 1, and 1-byte PA (Post Ambles) 1.

The header 2 field contains 8-byte VFO2, 3-byte AM, 4-byte PID2, 2-byte IED2, and 1-byte PA2.

The header 3 field contains 36-byte VFO1, 3-byte AM, 4-byte PID3, 2-byte IED3, and 1-byte PA1.

The header 4 field contains 8-byte VFO2, 3-byte AM, 4-byte PID4, 2-byte IED4, and 1-byte PA2.

Each of the PID1, PID2, PID3, and PID4 contains sector information and a physical sector number (physical address). Each of the VFO1 and VFO2 contains a continuous repetitive pattern (100010001000 . . . ) for a PLL (Phase Locked Loop) process. The AM contains a special mark (address mark) which violates a constraint length for indicating the PID position. Each of the IED1, IED2, IED3, and IED4 contains an error detection code for detecting a PID error. The PA contains state information required for demodulation, and also has a role of polarity adjustment to terminate the header field HF with a space. The mirror field MF stores mirror data.

The recording field RF records user data. The recording field contains a (10+J/16)-byte gap field, (20+K(-byte guard 1 field, 35-byte VFO3 field, 3-byte PS (pre-synchronous code) field, 2,418-byte data field (user data field), 1-byte post amble PA3 field, (55−K)-byte guard 2 field, and (25−J/16)-byte buffer field. Note that J assumes a random integer ranging from 0 to 15, and K assumes a random integer ranging from 0 to 7. In this manner, the data write start position is randomly shifted. As a result, deterioration of a recording film due to overwrite can be minimized.

The gap field records no data. The guide 1 field is a sacrificed area for absorbing leading edge deterioration caused by repetitive overwrite processes, which is unique to a phase-change recording film. The VFO3 field is a PLL lock field, and also has a roll of synchronizing byte boundaries by inserting a synchronous code in identical patterns. The PS code records a synchronous code.

The data field records a data ID, IED (Data ID Error Detection Code), synchronous code, ECC (Error Correction Code), EDC (Error Detection Code), 2,048-byte user data, and the like. The data ID contains a logical sector number (logical address). The IED is a 2-byte (16-bit) error correction code for the data ID.

The PA3 field contains state information required for demodulation, and indicates the end of the last byte in the previous data field. The guard 2 field prevents trailing edge deterioration upon repetitive recording, which is also unique to a phase-change recording medium, from influencing the data field. The buffer field absorbs variations of rotation of a motor for rotating the optical disk 1 and the like to prevent the data field from overlapping the next header field.

The PID1, PID2, PID3, and PID4 will be explained in detail below. Each of these PIDs contains 8-bit sector information, and a 24-bit physical sector number. The physical sector number records address data indicating the absolute position of the sector field. The sector information contains information such as a 2-bit reserved area, 2-bit physical ID number, 3-bit sector type, 1-bit layer number, and the like. The reserved area is a non-recording area.

The physical ID numbers in the header 1, 2, 3, and 4 fields record "00", "01", "10", and "11" indicating the PID1, PID2, PID3, and PID4, respectively.

The sector type records "000" or "011" indicating a reserved sector; "100" indicating a rewritable first sector in a track; "101" indicating a rewritable last sector in a track; "110" indicating a rewritable last but one sector in a track; or "111" indicating a rewritable other sector in a track.

The layer number records "0" indicating layer 0, or "1" indicating "reserved".

Figure 3:
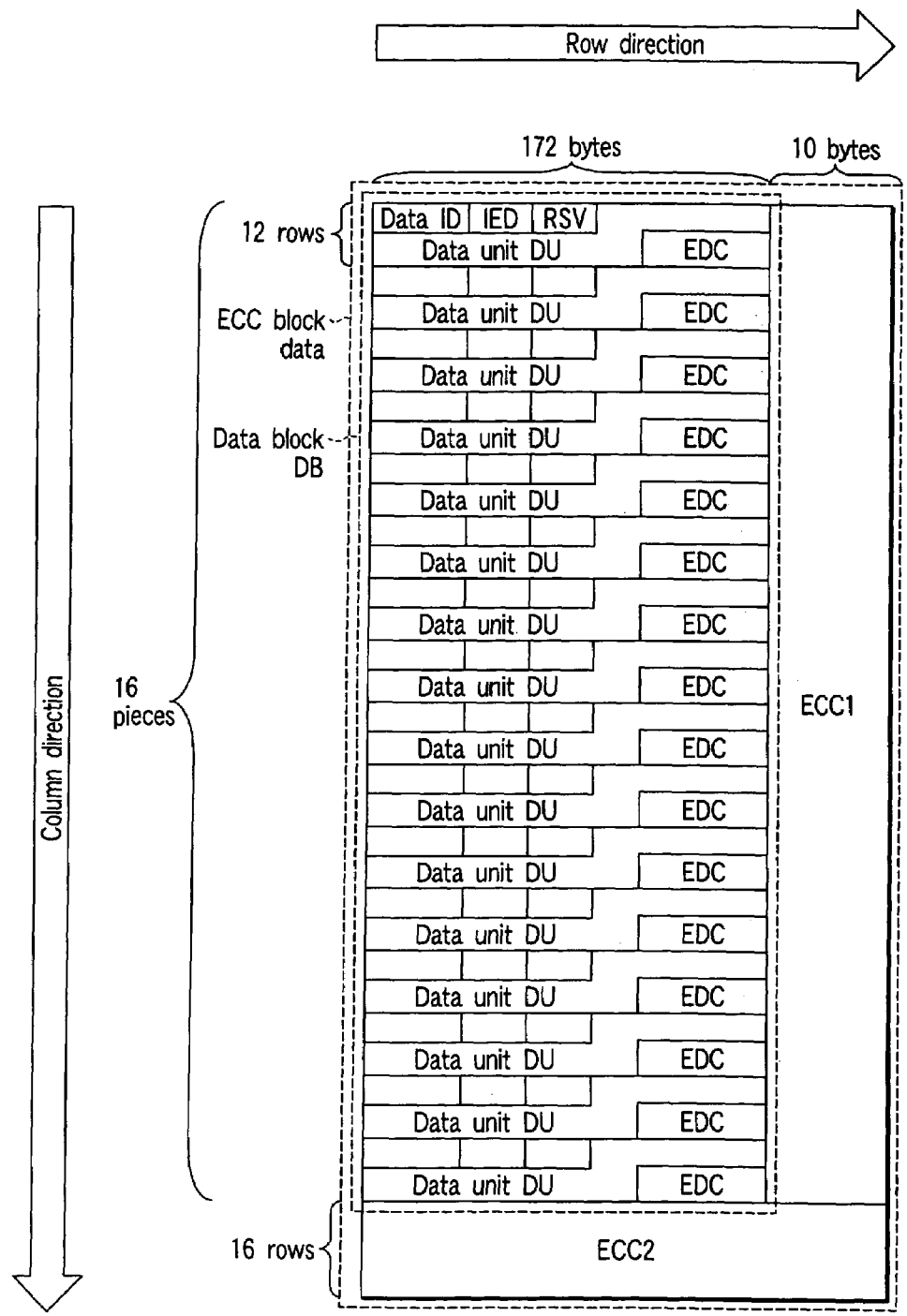
FIG. 3 is a view showing the structure of ECC block data.
Figure 4:
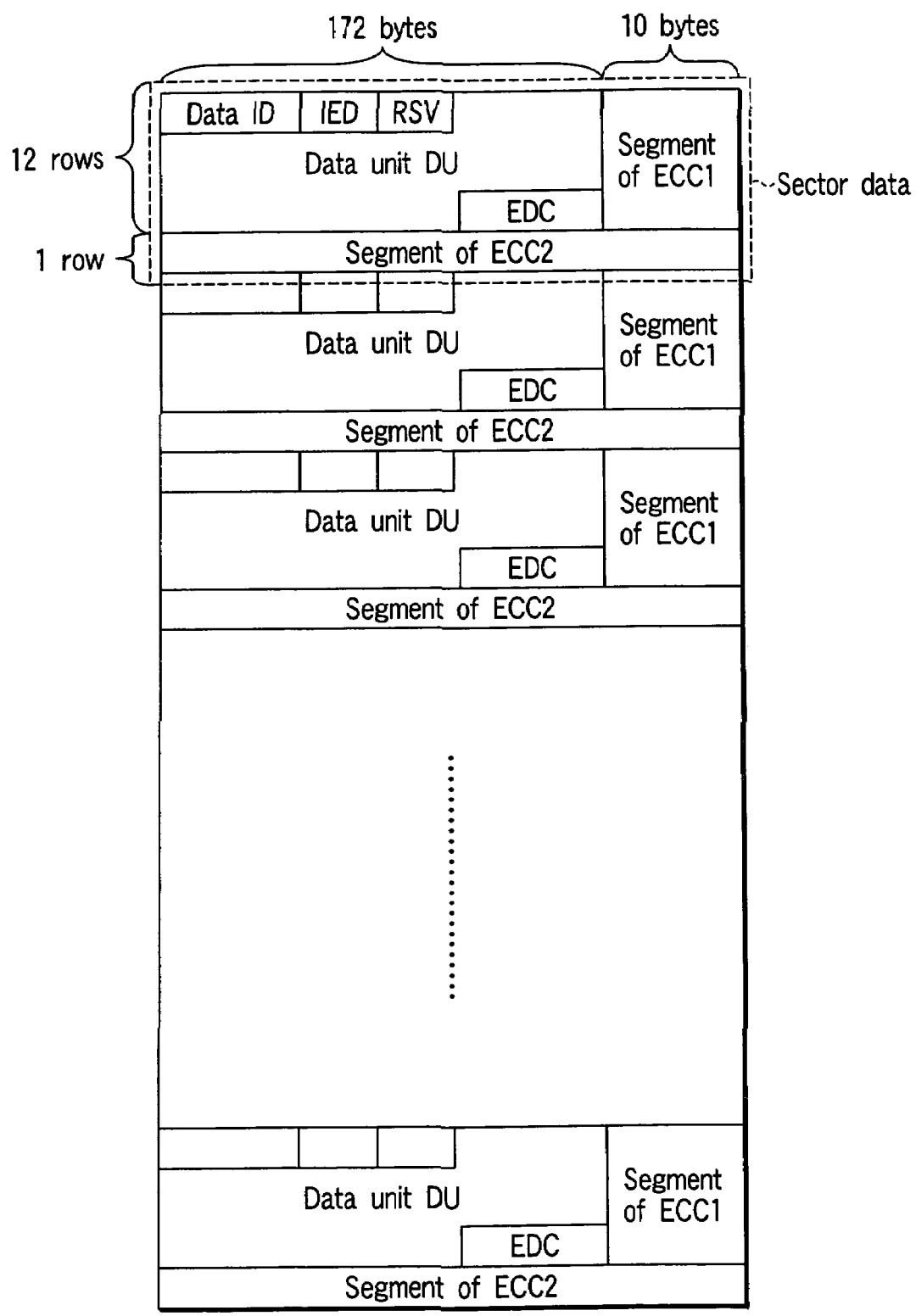
FIG. 4 is a view showing the data structure of sector data recorded on a data field.

The data structures of the ECC block data and sector data will be explained below with reference to FIGS. 3 and 4. FIG. 3 shows the data structure of the ECC block data. FIG. 4 shows the data structure of the sector data recorded in the data field shown in FIG. 2.

Tracks are formed on a DVD-RAM, and a plurality of sector fields are formed in each track. In other words, a plurality of successive sector fields form a track. The DVD-RAM records data in a format called ECC block data. Strictly speaking, 16 sector data generated based on the ECC block data are distributed and recorded in 16 sector fields. In addition, a group of sector data is recorded in the 2,418-byte data field shown in FIG. 2.

As shown in FIG. 3, the ECC block data consists of a data block DB (user data, and the like), ECC1, and ECC2.

The data block DB is constructed by an array of data which has a predetermined number of rows and columns, and can be segmented into 16 data units. More specifically, the data block DB is constructed by 172 (bytes)×12 (the number of rows forming each data unit)×16 (the number of data units forming the data block) data. Each data unit DU is constructed by 172 (bytes)×12 (the number of rows forming each data unit) data. Each data unit DU contains a data ID, IED, EDC, 2,048-byte user data, and the like. The data ID is used for scrambling user data contained in the data unit DU. The EDC is used for detecting any error contained in a set of data in the data unit.

The ECC1 is used for correcting LRC errors in the data block DB. More specifically, the ECC1 is constructed by 10 (bytes)×12 (the number of rows forming each data unit DU)×16 (the number of data units forming the data block) data. This ECC1 has error correction performance that normally corrects errors up to 5 bytes, and corrects errors up to 10 bytes upon erasure correction.

The ECC2 is used for correcting VRC errors in the data block DB. More specifically, the ECC2 is constructed by {172 (bytes)+10 (bytes)}×16 (the number of data units forming the data block) data. This ECC2 has error correction performance that normally corrects errors up to 8 bytes, and corrects errors up to 16 bytes upon erasure correction.

The sector data will be explained below with the aid of FIG. 4.

Sixteen sector data are generated from one ECC block data. One sector data consists of a data unit DU, a segment of the LRC error correction code ECC1, and a segment of the VRC error correction code ECC2, which is assigned to this data unit DU. More specifically, the sector data is composed of {172 (bytes)+10 (bytes)}×{12 (the number of rows forming each data unit DU)+1 (for one column of the VRC error correction code ECC2)} data.

Figure 5:
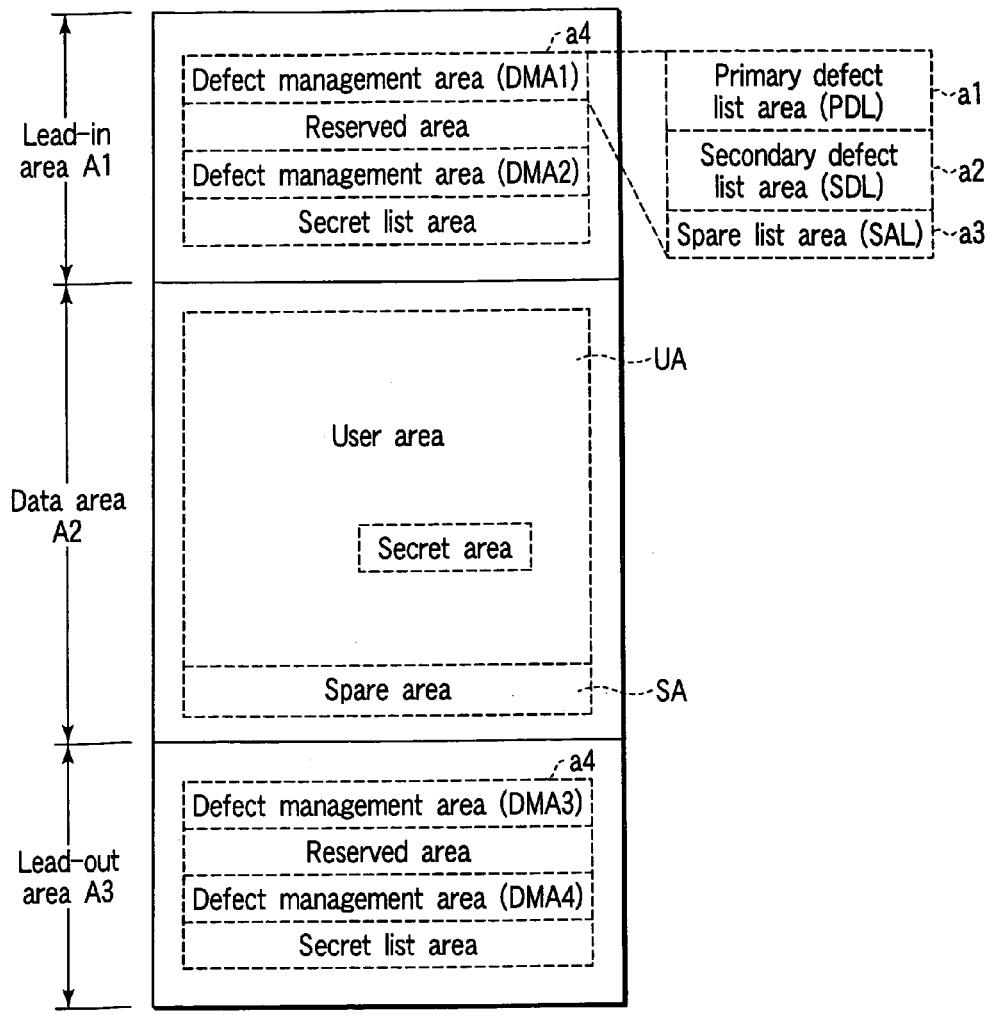
FIG. 5 is a view showing the data structure of the entire optical disk and, more particularly, various kinds of areas related to defect management, which are arranged in the lead-in area, data area, and lead-out area.
Figure 6:
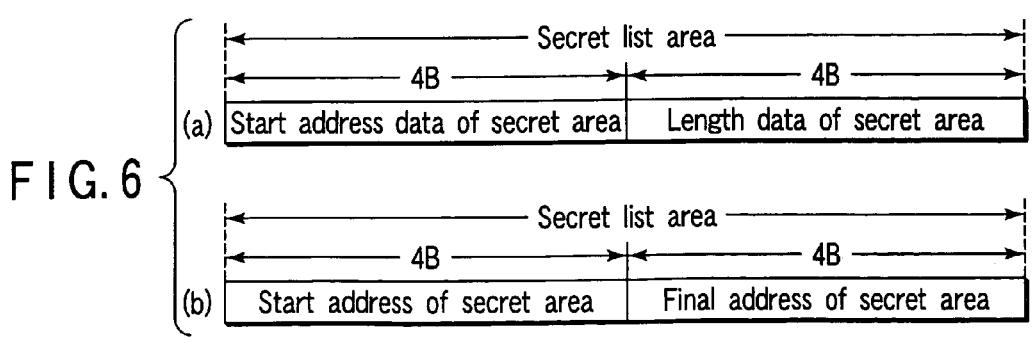
FIG. 6 is a view showing the data structures of a DMA address area.

FIG. 5 is a view showing the data structure of the entire disk and, more particularly, various kinds of areas related to defect management, which are arranged in the lead-in area A1, data area A2, and lead-out area A3. As shown in FIG. 5, DMA address areas are formed in the lead-in area A1 and lead-out area A3. Each DMA address area stores address data that indicates the position of a DMA, as shown in FIG. 6. For example, as shown in (a) of FIG. 6, the start address data (4 bytes) of a DMA and the length data (4 bytes) of the DMA are stored. Alternatively, as shown in (b) of FIG. 6, the start address data (4 bytes) of a DMA and the final address data (4 bytes) of the DMA are stored.

A DMA whose position is indicated by the address data is defined in the data area (especially, in the user area). That is, the DMA is subjected to a replacement process (to be described later). The replacement destination of the DMA is DMA reserved area 1, DMA reserved area 2, . . . , or DMA reserved area N. In the case shown in FIG. 5, the DMA reserved areas are arranged in the user area. However, the DMA reserved areas may be arranged in the spare area. With this structure, the reliability of data stored in the DMA can be maintained without any multiple write of the DMA. Pieces of information (defect management information) related to defect management are recorded in the DMA. For example, the DMA has a plurality of PDLs (Primary Defect Lists) and a plurality of SDLs (Secondary Defect Lists) as entries. Note that a Primary Defect is also called a first-stage defect.

FIG. 7 is a view showing the schematic data structure of a PDL. FIG. 8 is a view showing the schematic data structure of an SDL. As shown in FIG. 7, a PDL includes sequentially from the start an area where an entry type is recorded, a reserved area, and an area where the physical sector number of a defective sector (that indicates a sector field with a defect) is recorded. As shown in FIG. 8, an SDL includes sequentially from the start an area where an assignment mark (FRM) is recorded, a reserved area, an area where the physical sector number of the first sector (that indicates a first sector field in 16 sector fields of a defective block) in a defective block is recorded, a reserved area, and the physical sector number of the first sector (that indicates a first sector field in 16 sector fields of a replacement block) in a replacement block.

As already described with reference to FIG. 6, pieces of position information (address, length, and the like) indicating the position of a DMA are recorded in the DMA address area. Conventionally, the DMA itself including the DDS, PDL, and SDL is arranged at the inner and outer peripheries. To the contrary, in the medium according to an aspect of the present invention, only the pieces of position information indicating the position of the DMA are recorded at the inner and outer peripheries. The entity of the DMA can be moved by rewriting the position information. For this reason, if the number of defects in the entity of the DMA increases, the entity of the DMA can be moved to another area. That is, the entity of the DMA can be recorded in a replacement destination. For smooth movement, a reserved area for the DMA is ensured in advance. For example, a reserved area is ensured in each of the N zones, and a DMA is moved in accordance with a rule to sequentially move it from the inner periphery side as the number of defects in the DMA increases. With this structure, the DMA can be moved to (N−1) positions. Conventionally, to protect the DMA itself that is not defect-managed, two DMAs on the inner periphery side and two DMAs on the outer periphery side, i.e., a total of four DMAs must be rewritten. To the contrary, in the present invention, only one DMA need be rewritten. In the present invention as well, two or more DMAs may be simultaneously rewritten. When two DMAs are to be arranged, two positions must be designated. When the respective DMAs are arranged to oppose each other in the same zone not to reduce the access speed, the DMAs become resistant against defects.

A replacement process will be explained below. The replacement process includes a slipping replacement process and a linear replacement process. The slipping replacement process is done for primary defects in units of sector fields. The linear replacement process is done for secondary defects in units of ECC block data. These processes will be described in detail below.

The slipping replacement process will be explained first.

Before delivery of an optical disk, it is certified if the rewritable data zone on the optical disk suffers defects (primary defects). That is, it is certified if data can be normally recorded in the rewritable data zone. This certification is done in units of sector fields.

During the certification, if a defective sector (indicating a sector field including defects) is found, the physical sector number of this defective sector is recorded in the PDL. Furthermore, no logical sector number is assigned to this defective sector. More specifically, logical sector numbers are assigned to only normal sectors (indicating sector fields free from any defects) allocated before and after this defective sector by ignoring the defective sector. That is, the defective sector is considered as a non-existing sector. In this manner, user data or the like is prevented from being written in such defective sector. A series of processes mentioned above are done in the slipping replacement process. Thus, the defective sectors are slipped in this slipping replacement process.

The slipping replacement process will be described in more detail with reference to FIG. 9.

Figure 9:
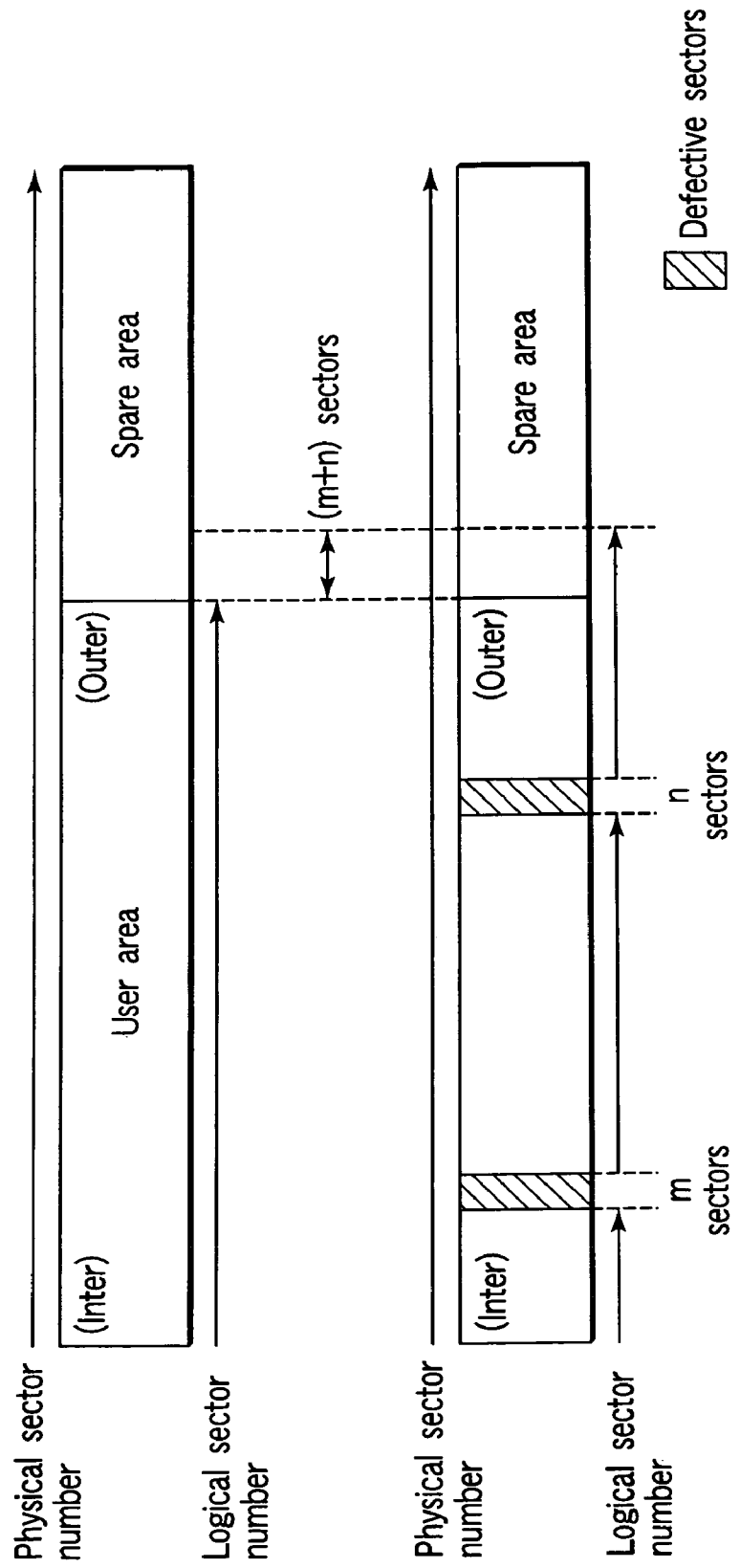
FIG. 9 is a view for explaining a slipping replacement process.

Assume that a user area (a user area UA shown in FIG. 5) and a spare area (a spare area SA shown in FIG. 5) are present, as shown in FIG. 9. Also, these user and spare areas are present in any of zones 0 to N described above with reference to FIG. 1.

For example, if m defective sectors and n defective sectors are found during certification, the (m+n) defective sectors are compensated for by the spare area. That is, the sectors contained in those constructing the user area shown in the upper illustration in FIG. 9 are compensated for by the spare area. As described above, no logical sector numbers are assigned to the m and n defective sectors. In addition, the spare area also undergoes a slipping replacement process. Hence, if any defective sector is found in the spare area, it is processed by the aforementioned slipping replacement process. Note that all sectors have physical sector numbers irrespective of defective or normal sectors.

Second, the linear replacement process will be explained.

When user data is written after delivery of an optical disk, it is verified if the user data is normally written. A situation that user data cannot be normally written is called a secondary defect. The presence/absence of secondary defects is verified in units of 16 sector fields (i.e., in units of blocks) each of which records the ECC block data shown in FIG. 3.

If a defective block (indicating a block including secondary defects) is found, the physical sector number of the first sector in the defective block and the physical sector number of the first sector in a replacement block (indicating a block to be assured in the spare area) that is to replace the defective block are recorded in the SDL. Also, the logical sector numbers assigned to 16 sector fields in the defective block are assigned to 16 sector fields in the replacement block. In this manner, data to be recorded in the defective block is recorded in the replacement block. After that, access to the defective block is considered as that to the replacement block. A series of processes mentioned above are done in the linear replacement process. That is, in this linear replacement process, a defective block is linearly replaced.

The linear replacement process will be described in more detail below with reference to FIG. 10.

Figure 10:
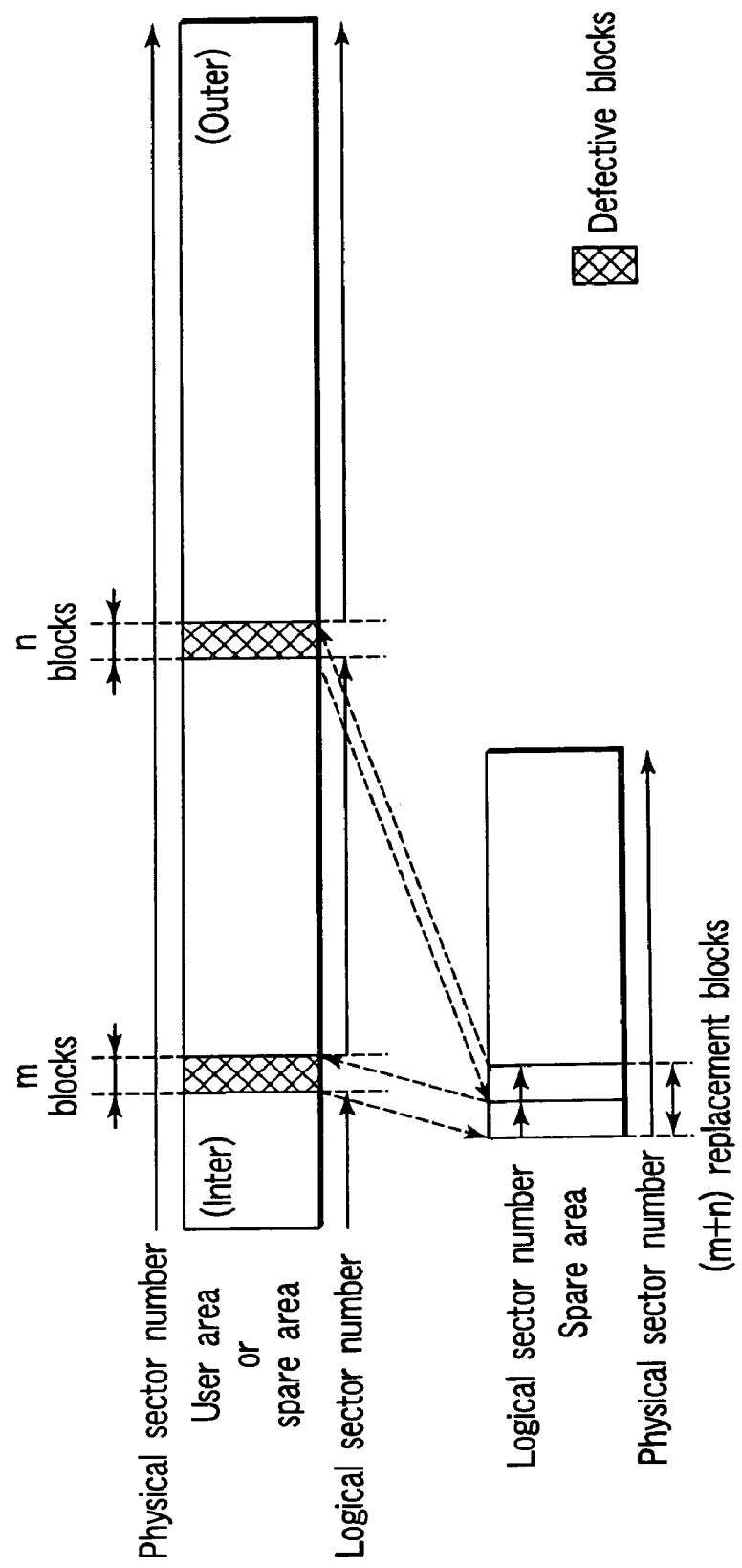
FIG. 10 is a view for explaining a linear replacement process.

Assume that a user area and a spare area are present, as shown in FIG. 10. Also, these user and spare areas are present in any of zones 0 to N described above with reference to FIG. 1.

For example, if m defective blocks and n defective blocks are found upon writing user data, (m+n) defective blocks are compensated for by (m+n) replacement blocks in the spare area. As described above, the physical sector numbers assigned to {16×(m+n)} sector fields that build the m and n defective blocks are passed onto those that build (m+n) replacement blocks. In addition, the spare area also undergoes a linear replacement process. Hence, if any defective block is found in the spare area, it is processed by the aforementioned linear replacement process. Note that all sector fields that make up the block have physical sector numbers irrespective of a defective or normal block.

User data write processes corresponding to the slipping replacement process and linear replacement process will be explained below.

User data is written in the user area based on the PDL and SDL. That is, when user data is written in a given sector field, if this sector field is registered in the PDL, user data is written in a normal sector field next to this defective sector by slipping it. When a write block of user data is a defective block registered in the SDL, the user data is written in a replacement block corresponding to that defective block.

The format of an optical disk will be described below.

In a FAT (file allocation table) prevalently used in file systems of information storage media (hard disks, magnetooptical disks, and the like) for personal computers, information is recorded on an information recording medium to have 256 or 512 bytes as a minimum unit.

By contrast, in information storage media such as a DVD-video, DVD-ROM, DVD-R, DVD-RAM, and the like, a UDF (universal disk format) specified by OSTA and ISO13346 are used as a file system. In this case, information is recorded on an information recording medium to have 2,048 bytes as a minimum unit. The file management method is basically premised on a hierarchical file system which manages files in a tree pattern to have a root directory as a parent directory.

Figure 11:
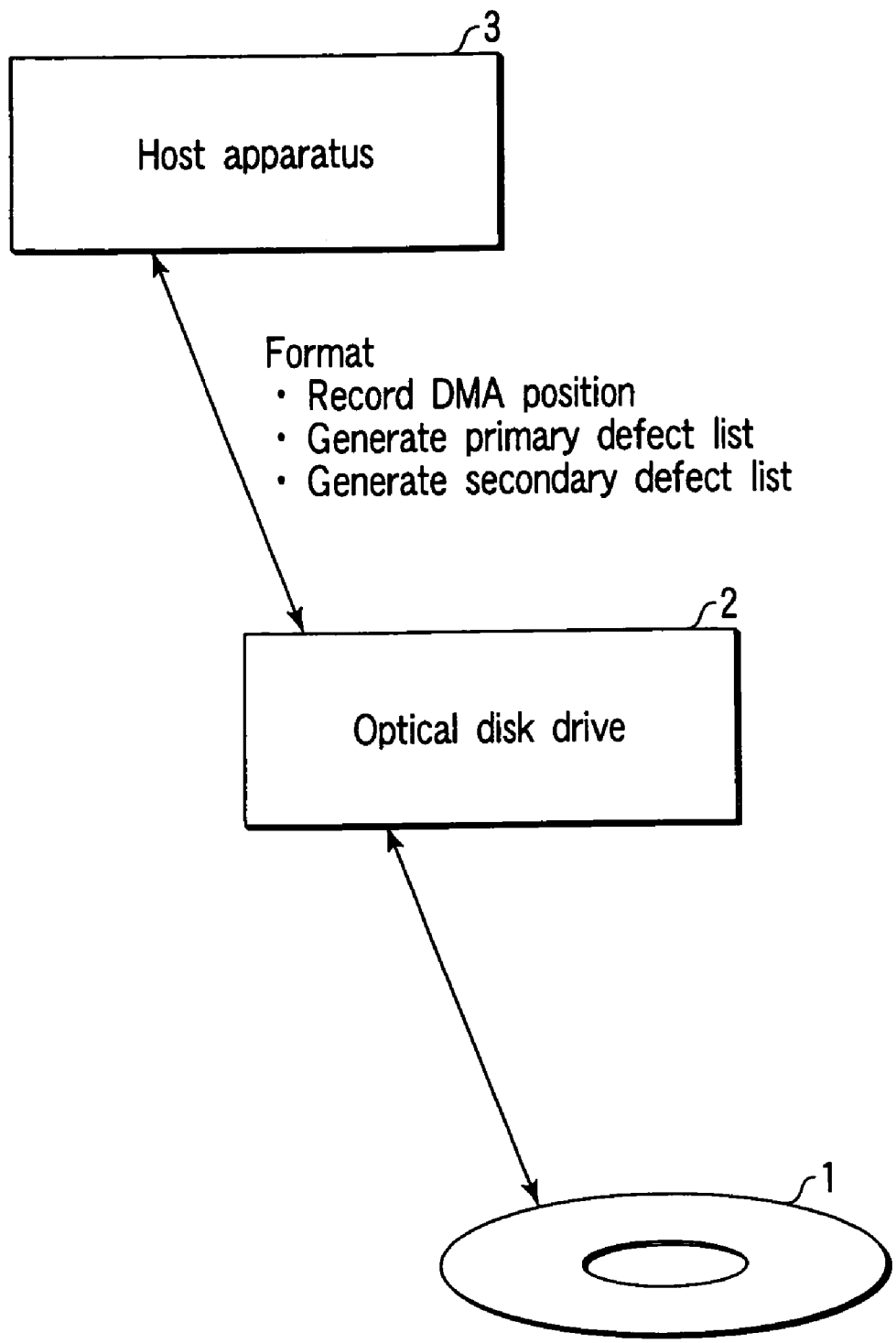
FIG. 11 is a view showing the relationship between a host apparatus, an optical disk drive, and an optical disk.

As shown in FIG. 11, the optical disk 1 is formatted by the optical disk drive 2 connected to the host apparatus 3. The host apparatus 3 issues various kinds of instructions to the optical disk drive 2. The optical disk drive 2 executes various kinds of operations in accordance with instructions sent from the host apparatus 3.

Upon formatting, the position information of the DMA is created in the DMA address area in the lead-in area A1 of the optical disk 1, and the defect management list (the entity of the DMA) is created in the DMA in the user area. The drive can move the DMA position before the number of defects in the DMA itself increases to an uncorrectable level. In the present invention, the resistance of the DMA itself against errors is increased by allowing changing of the DMA position, so the access frequency for rewrites of DMA contents can be decreased.

Figure 12:
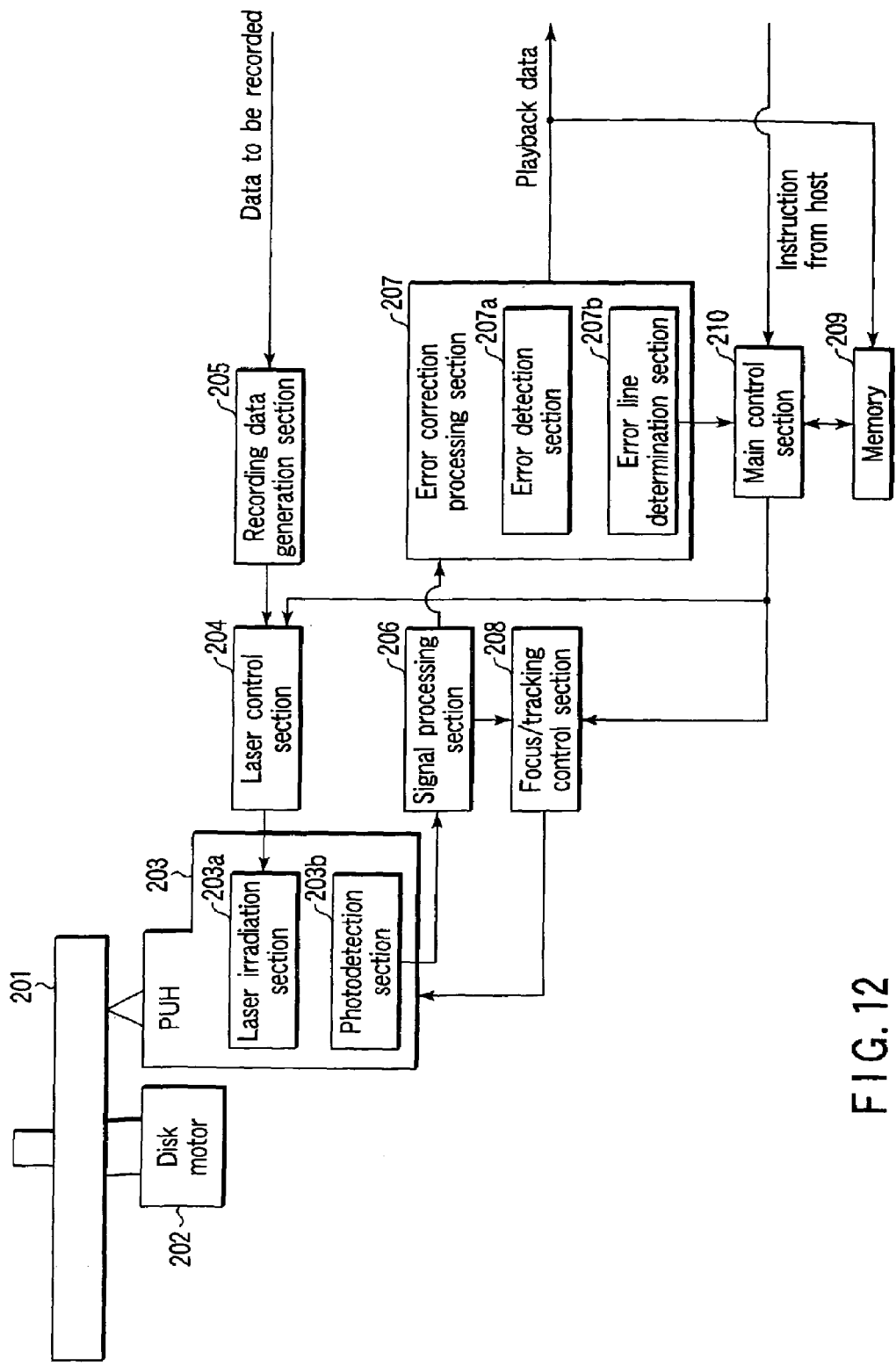
FIG. 12 is a block diagram showing the schematic arrangement of an information recording/playback apparatus.

The schematic arrangement of an information recording/playback apparatus (optical disk drive 2) will be described below with reference to FIG. 12. The information recording/playback apparatus shown in FIG. 12 records predetermined data on the optical disk 1 corresponding to the information recording medium of the present invention or plays back information recorded on the optical disk 1. The information recording/playback apparatus comprises a disk motor 202, PUH (PickUp Head) 203, laser control section 204, recording data generation section 205, signal processing section 206, error correction processing section 207, focus/tracking control section 208, memory 209, main control section 210, and the like.

The disk motor 202 rotates the optical disk 1 at a predetermined rotational speed. The PUH 203 has a laser irradiation section 203a and photodetection section 203b. The laser irradiation section 203a selectively irradiates the optical disk with one of a recording light beam and playback light beam that have different irradiation powers. The photodetection section 203b detects reflected light, from the optical disk, of the light beam emitted from the laser irradiation section 203a. The laser control section 204 ON/OFF-controls the laser irradiation section 203a and also controls the irradiation power of the light beam to be emitted from the laser irradiation section 203a. The recording data generation section 205 adds an error correcting code to data to be recorded, thereby generating recording data.

The signal processing section 206 plays back data reflected on the reflected light detected by the photodetection section 203b. The error correction processing section 207 corrects an error contained in the play back data on the basis of the error correcting code contained in the data played back by the signal processing section 206. The error correction processing section 207 has an error detection section 207a and error line determination section 207b. The error detection section 207a detects the number of error bytes contained in play back data in one line on the basis of the error correcting code contained in the data played back by the signal processing section 206. The error line determination section 207b determines on the basis of the error detection result whether the played back line corresponds to an error line. For example, a line containing errors of 5 bytes or more is determined as an error line. When a line contains errors up to 4 bytes, the line can be corrected by the error correcting capability of the error correcting code. However, if a line contains more error bytes, it cannot be corrected by the error correcting code. For this reason, a line containing errors of 5 bytes or more is determined as an error line.

The focus/tracking control section 208 controls focus and tracking of a light beam emitted from the PUH 203 on the basis of the data played back by the signal processing section 206. The memory 209 stores various kinds of control information in advance. The memory 209 also stores various kinds of control information read out from the optical disk. The main control section 210 controls the information recording/playback apparatus on the basis of instructions from a host apparatus 3 and the various kinds of control information stored in the memory 209 to record desired information on the optical disk 1 or play back desired information recorded on the optical disk 1.

A recording process for recording information on the optical disk 1 and a playback process for playing back information from the optical disk 1 by the above-described information recording/playback apparatus will be described.

The recording process will be described with reference to FIG. 13. When the optical disk 1 is loaded in the information recording/playback apparatus, the main control section 210 instructs to read the lead-in area and lead-out area. On the basis of this instruction, the laser control section 204 controls the laser irradiation section 203a. Simultaneously, the focus/tracking control section 208 starts controlling focus/tracking. Various kinds of control information are read out from the lead-in area and lead-out area (ST101). At this time, address data are read out from the DMA address areas in the lead-in area and lead-out area (ST102). The DMA is accessed on the basis of the address data to read out defect management information from the DMA (ST103). The read-out defect management information is stored in the memory 209 as control information.

As already described above, the entity of the DMA is arranged in the user area. Hence, the DMA also undergoes defect management whereby the reliability of defect management information stored in the DMA can be maintained. When defect management information is read out from the DMA, the DMA is recorded in a replacement destination under a predetermined condition serving as a criterion. For example, when the number of errors contained in the readout data (defect management information) exceeds a predetermined value (YES in ST104), the defect management information is recorded in a replacement destination. That is, the defect management information is moved to a DMA reserved area (ST105). The DMA reserved areas are used in an order of, e.g., DMA reserved area 1, DMA reserved area 2, . . . , and DMA reserved area N. The use order of DMA reserved areas is stored in the memory 209 of the information recording/playback apparatus as control information in advance. When the defect management information is recorded in the DMA reserved area as a replacement destination, the address stored in the DMA address area is rewritten. That is, the address is rewritten to an address indicating the DMA reserved area. If the number of errors contained in the readout data is equal to or smaller than a predetermined value (NO in ST104), the defect management information is not recorded in a replacement destination. For example, a condition may be set such that the defect management information is recorded in a replacement destination before the number of errors exceeds the error correction capability of the ECC.

When the host apparatus 3 instructs to record desired data at a desired address in the user area, a recording process of the desired data for the desired address is executed under the control of the main control section 210 (YES in ST106). If it is determined on the basis of the defect management information that the recording designation at the desired address does not correspond to any defective area (NO in ST107), the desired data is recorded at the desired address (ST108). If it is determined on the basis of the defect management information that the recording designation at the desired address corresponds to a defective area (YES in ST107), the desired data is recorded an address (spare area) as a replacement destination corresponding to the desired address (ST109). In addition, information representing that the data is recorded in a replacement destination is additionally recorded in the DMA (ST110).

Figure 14:
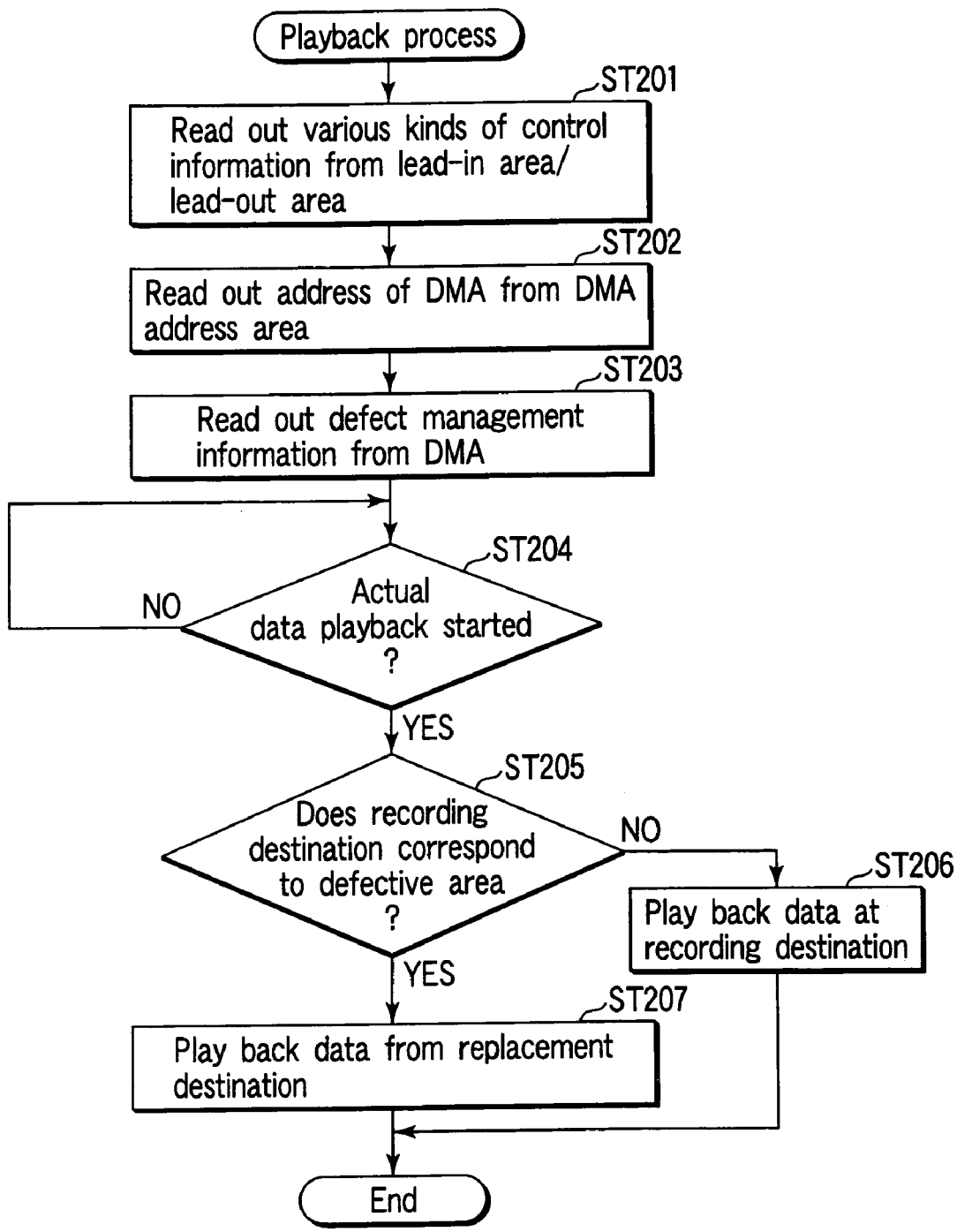
FIG. 14 is a flow chart for explaining a playback process for the optical disk.

The playback process will be described next with reference to FIG. 14. When the optical disk 1 is loaded in the information recording/playback apparatus, the main control section 210 instructs to read the lead-in area and lead-out area. On the basis of this instruction, the laser control section 204 controls the laser irradiation section 203a. Simultaneously, the focus/tracking control section 208 starts controlling focus/tracking. Various kinds of control information are read out from the lead-in area and lead-out area (ST201). At this time, address data are read out from the DMA address areas in the lead-in area and lead-out area (ST202). The DMA is accessed on the basis of the address data to read out defect management information from the DMA (ST203). The readout defect management information is stored in the-memory 209 as control information.

When the host apparatus 3 instructs to play back desired data from a desired address in the user area, a playback process of the desired data from the desired address is executed under the control of the main control section 210 (YES in ST204). If it is determined on the basis of the defect management information that the recording designation at the desired address does not correspond to any defective area (NO in ST205), the desired data is played back from the desired address (ST206). If it is determined on the basis of the defect management information that the recording designation at the desired address corresponds to a defective area (YES in ST205), the desired data is played back from a spare area at the replacement destination of the defective area (ST207).

Figure 15:
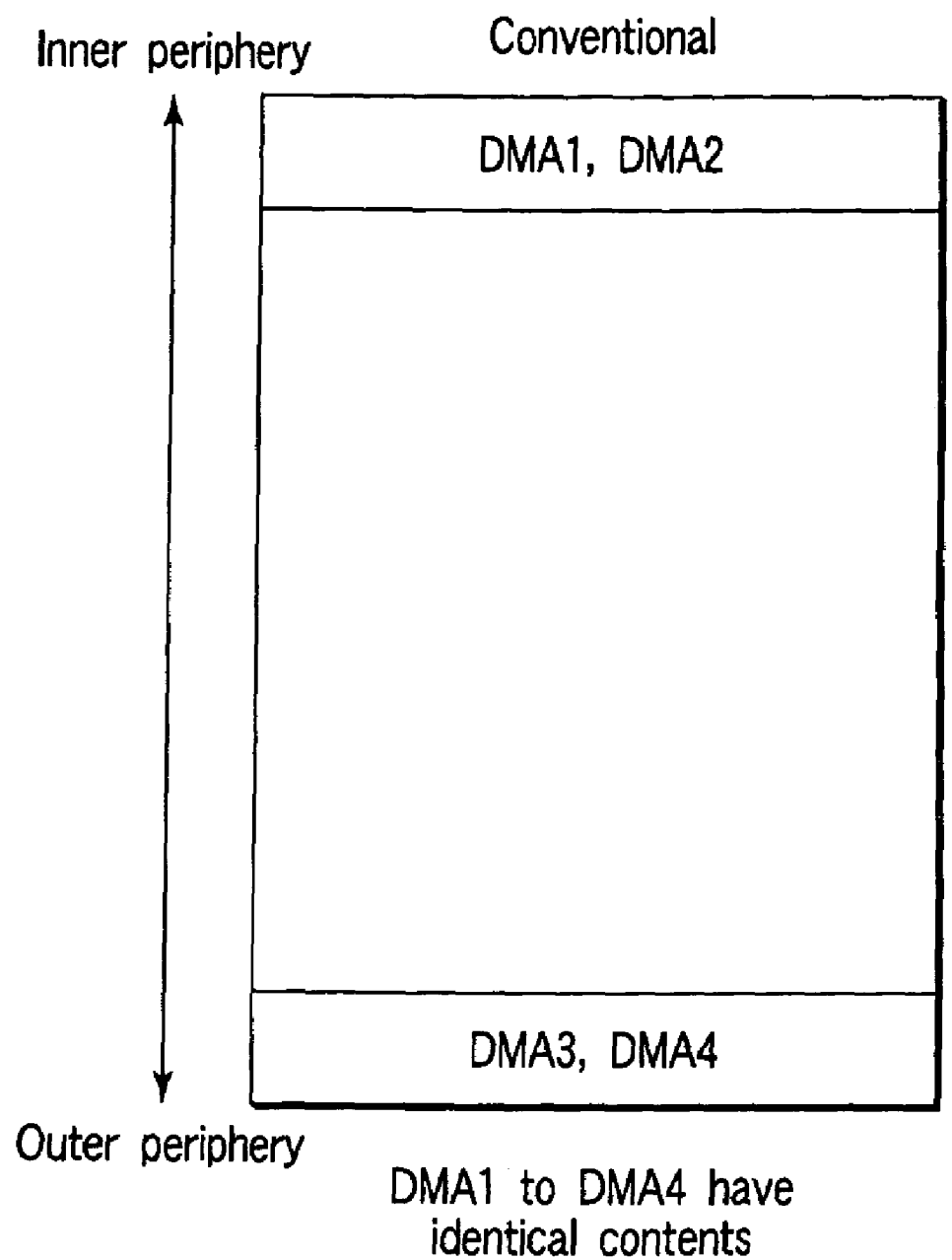
FIG. 15 is a view showing the data structure of an optical disk to which a conventional defect management method is applied.
Figure 16:
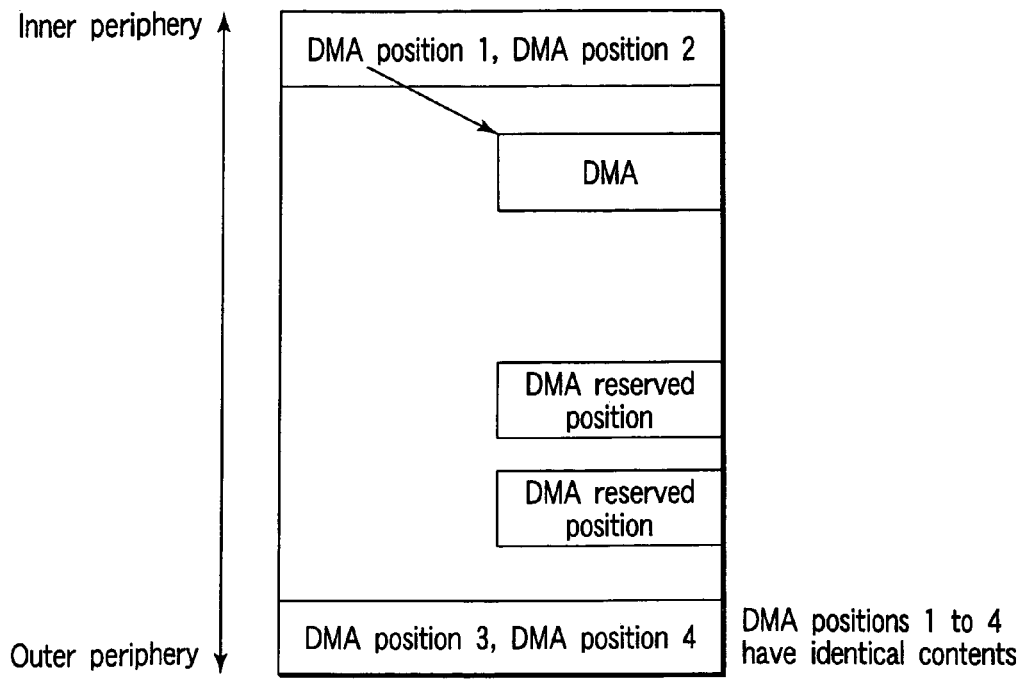
FIG. 16 is a view showing the data structure of an optical disk to which a defect management method is applied.
Figure 17:
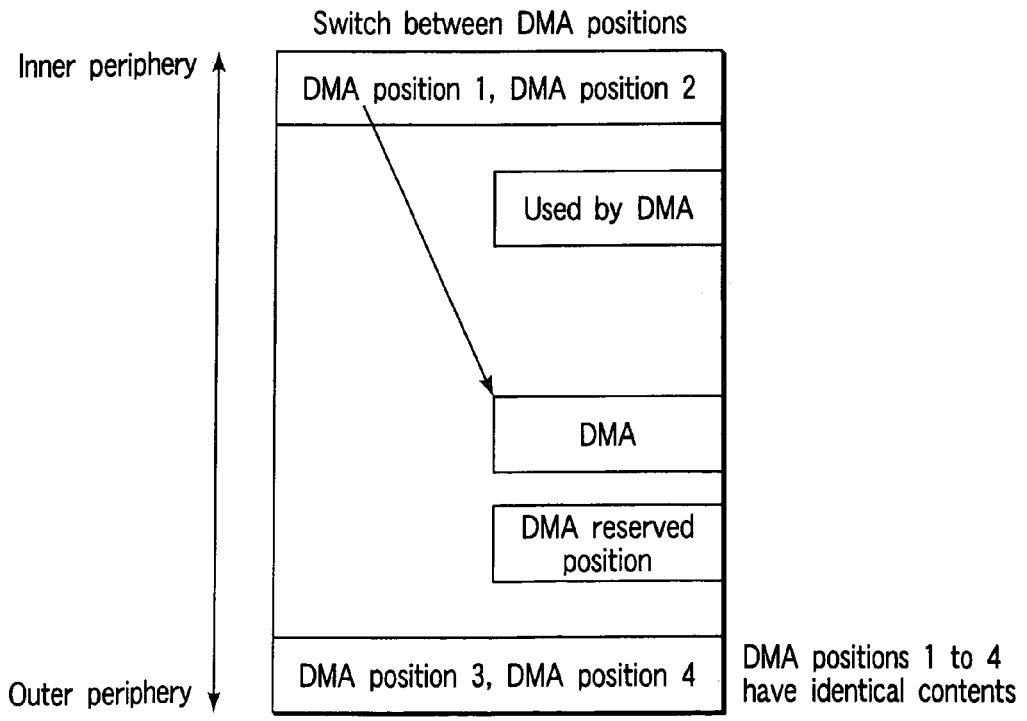
FIG. 17 is a view showing the data structure of an optical disk to which a defect management method is applied and, particularly, a state wherein a DMA is recorded at a replacement address on a DMA reserved area.
Figure 18:
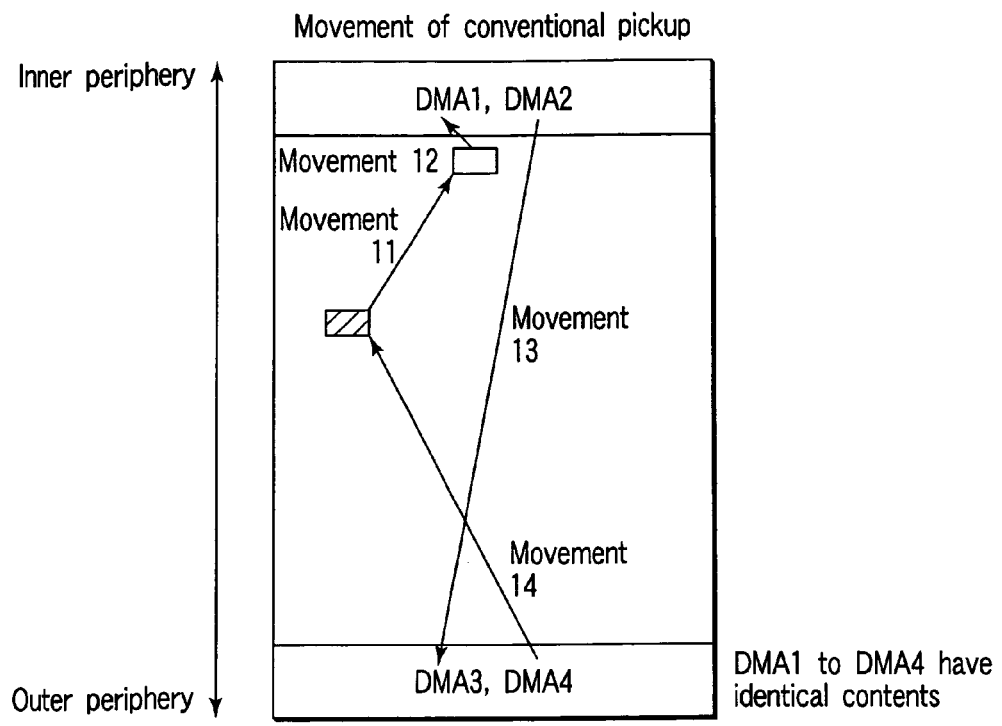
FIG. 18 is a view showing the movement of an optical pickup head for the optical disk to which the conventional defect management method is applied.
Figure 19:
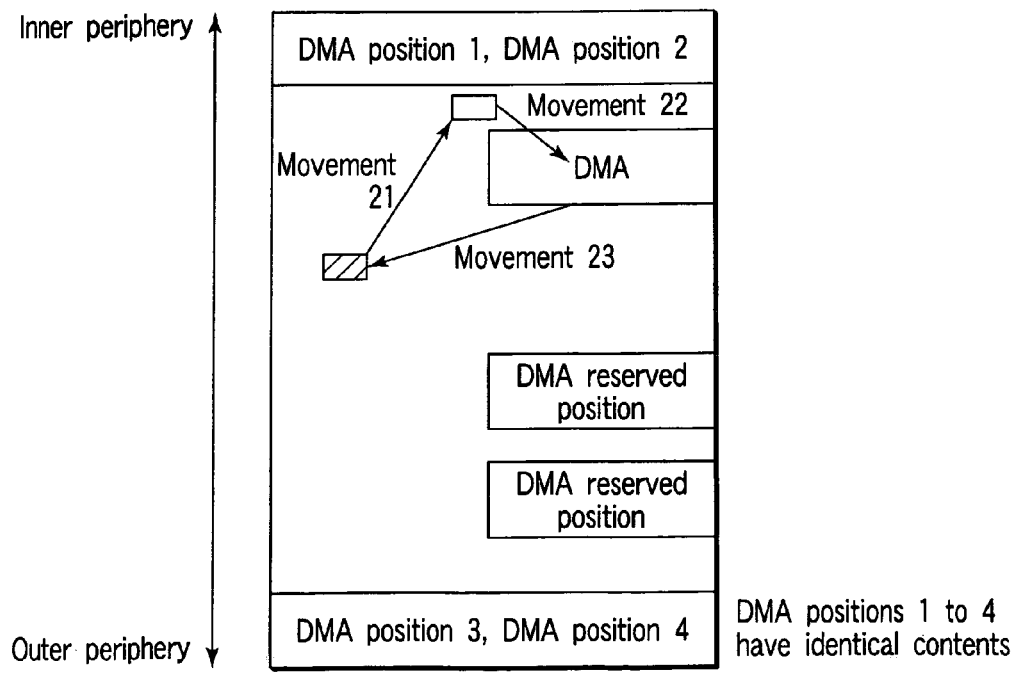
FIG. 19 is a view showing the movement of an optical pickup head for the optical disk to which the defect management method of the present invention is applied.

The difference between conventional defect management and that of the present invention will be described next with reference to FIGS. 15 to 19. FIG. 15 is a view showing the schematic data structure of an optical disk to which a conventional defect management method is applied. FIGS. 16 and 17 are views showing the schematic data structure of an optical disk to which the defect management method according to embodiments of the present invention is applied. FIG. 18 is a view showing the movement of an optical pickup head for the optical disk to which the conventional defect management method is applied. FIG. 19 is a view showing the movement of an optical pickup head for the optical disk to which the defect management method according to embodiments of the present invention is applied.

In the conventional optical disk, the entity of a DMA is written multiple times in the innermost periphery (lead-in area) and outermost periphery (lead-out area), as shown in FIG. 15. That is, DMA1 and DMA2 are repetitively written in the innermost periphery, and DMA3 and DMA4 are repetitively written in the outermost periphery.

To the contrary, in the optical disk according to embodiments of the present invention, only an address that indicates the position of a DMA is written multiple times in the innermost periphery (lead-in area) and outermost periphery (lead-out area), as shown in FIGS. 16 and 17. That is, DMA position 1 and DMA position 2 are repetitively written in the DMA address area at the innermost periphery as an address that indicates the position of the DMA. DMA position 3 and DMA position 4 are repetitively written in the DMA address area at the outermost periphery as an address that indicates the position of the DMA. Note that a plurality of DMA reserved areas (DMA reserved positions in FIG. 16) are prepared as the replacement/recording destinations of the entity of the DMA. As shown in FIG. 17, only when the entity of the DMA is recorded in a DMA reserved area as a replacement destination, the addresses at the innermost and outermost peripheries, that indicate the DMA position, are rewritten.

In the conventional optical disk, as shown in FIG. 18, when a desired access destination (recording destination) is subjected to defect management (hatched portion in FIG. 18), the optical pickup head moves first to the replacement destination (spare area) (movement 11) to record desired data at this replacement destination. Next, the optical pickup head moves to DMA1 and DMA2 at the innermost periphery (movement 12) to update DMA1 and DMA2 (to additionally record defect management information). The optical pickup head further moves to DMA3 and DMA4 at the outermost periphery (movement 13) to update DMA3 and DMA4. After that, the optical pickup head returns to the position following the desired access destination (recording destination) again (movement 14) to continuously record the desired data.

To the contrary, in the optical disk according to embodiments of the present invention, as shown in FIG. 19, when a desired access destination (recording destination) is subjected to defect management (hatched portion in FIG. 19), the optical pickup head moves first to the replacement destination (spare area) (movement 21) to record desired data at this replacement destination. Next, the optical pickup head moves to the DMA in the user area (movement 22) to update the DMA (to additionally record defect management information). After that, the optical pickup head returns to the position following the desired access destination (recording destination) again (movement 23) to continuously record the desired data.

As described above, the access operation by the optical pickup head can be considerably simplified. Consequently, the access speed can be increased.

In the above description, DMA address areas are prepared in the lead-in area and lead-out area. A recording position is determined for a case wherein the entity of a DMA is managed by address data stored in the DMA address area. However, the present invention may be as follows. For example, the recording position of the entity of a DMA is registered in advance. The recording position here includes not only the initial position but also a DMA reserved area. When only information representing the recording position in use is recorded, the recording destination of the DMA can always be grasped without storing the address data of the recording destination of the DMA in the lead-in area and lead-out area.

According to the above embodiment, the following medium and apparatuses can be obtained.

(1) An information recording medium having a data structure capable of contributing to an increase in replacement process speed.

(2) An information recording apparatus capable of increasing the replacement process speed.

(3) An information playback apparatus capable of accurately playing back an information recording medium having a data structure that contributes to an increase in replacement process speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording method for recording information on an information recording medium comprising a defect management area for recording defect management information representing a relationship between a defective area and a spare area serving as a replacement destination of the defective area, a reserved area which becomes a replacement destination of the defect management information based on defects detection in the defect management area, and a management area for recording address data representing a position of the defect management area at an initial state, and recording address data representing a position of the reserved area after the defect management information is recorded in the reserved area based on the defects detection in the defect management area, said information recording method comprising:

reading out the defect management information from one of the defect management area and the reserved area on the basis of the address data recorded in the management area;

when it is determined that a predetermined recording destination in the data area of the information recording medium corresponds to the defective area on the basis of the defect management information stored in the defect management area at the time of recording desired data to the predetermined recording destination, recording the desired data in the spare area corresponding to the defective area;

recording the defect management information read out from the defect management area in the reserved area on the basis of the defects detection in the defect management area;

reading out the defect management information from one of the defect management area and the reserved area on the basis of the address data recorded in the management area; and when it is determined that a predetermined recording destination in the data area of the information recording medium corresponds to the defective area on the basis of the defect management information stored in the reserved area at the time of recording desired data to the predetermined recording destination, recording the desired data in the spare area corresponding to the defective area.

\* \* \* \* \*

UNITED STATES PATENT AND TRADEMARK OFFICE
CERTIFICATE OF CORRECTION

| | | |
|---|---|---|
| PATENT NO. | : 7,274,634 B2 | Page 1 of 1 |
| APPLICATION NO. | : 11/281373 | |
| DATED | : September 25, 2007 | |
| INVENTOR(S) | : Takahashi | |

It is certified that error appears in the above-identified patent and that said Letters Patent is hereby corrected as shown below:

-- (45) Date of Patent: *Sep. 25, 2007

(*) Notice: Subject to any disclaimer, the term of this patent is extended or adjusted under 35 U.S.C. 154(b) by 0 days.

This patent is subject to a terminal disclaimer. --

Signed and Sealed this

Eleventh Day of December, 2007

JON W. DUDAS
*Director of the United States Patent and Trademark Office*